(12) United States Patent
Nam

(10) Patent No.: US 7,816,887 B2
(45) Date of Patent: Oct. 19, 2010

(54) BATTERY CHARGER FOR PORTABLE EQUIPMENT

(76) Inventor: Sang-Yool Nam, 26/10, 1282-13, Baekseok-dong, Dong-gu, Ilsan-gu, Gyeonggi-do (KR) 411-360

( * ) Notice: Subject to any disclaimer, the term of this patent is extended or adjusted under 35 U.S.C. 154(b) by 528 days.

(21) Appl. No.: 11/996,499

(22) PCT Filed: Jul. 26, 2006

(86) PCT No.: PCT/KR2006/002937

§ 371 (c)(1),
(2), (4) Date: Jan. 22, 2008

(87) PCT Pub. No.: WO2007/015605

PCT Pub. Date: Feb. 8, 2007

(65) Prior Publication Data

US 2008/0164841 A1 Jul. 10, 2008

(30) Foreign Application Priority Data

Aug. 4, 2005 (KR) .................. 20-2005-0022612 U

(51) Int. Cl.
*H02J 7/00* (2006.01)
(52) U.S. Cl. ..................... 320/110; 320/106; 320/107
(58) Field of Classification Search ............... 320/110
See application file for complete search history.

(56) References Cited

U.S. PATENT DOCUMENTS 6,404,168 B1 * 6/2002 Shoji ........................ 320/134
6,624,616 B1 * 9/2003 Frerking et al. ............. 320/162

* cited by examiner

*Primary Examiner*—Edward Tso
*Assistant Examiner*—M'Baye Diao
(74) *Attorney, Agent, or Firm*—Sherr & Vaughn, PLLC

(57) ABSTRACT

The present invention relates to a battery charger for charging multiple types of portable equipments, comprising a charging pin housing including a plurality of charging spring pins having a predetermined distance therebetween; a moving motor for detecting an insertion of a battery and sliding the charging pin housing inward and outward; and a charge controller for suspending an operation of the moving motor when a contact of a charging terminal of the inserted battery to two or more charging spring pins of the plurality of the charging spring pins are detected during the sliding of the charging pin housing, and for quick-charging the battery through the two or more charging spring pins connected to a charging circuit. In accordance with the present invention, a discharged battery of a portable equipment may be charged easily regardless of a difference between sizes, polarities and positions of terminals of the battery of different portable equipments including mobile phones.

5 Claims, 4 Drawing Sheets

[Fig. 1]
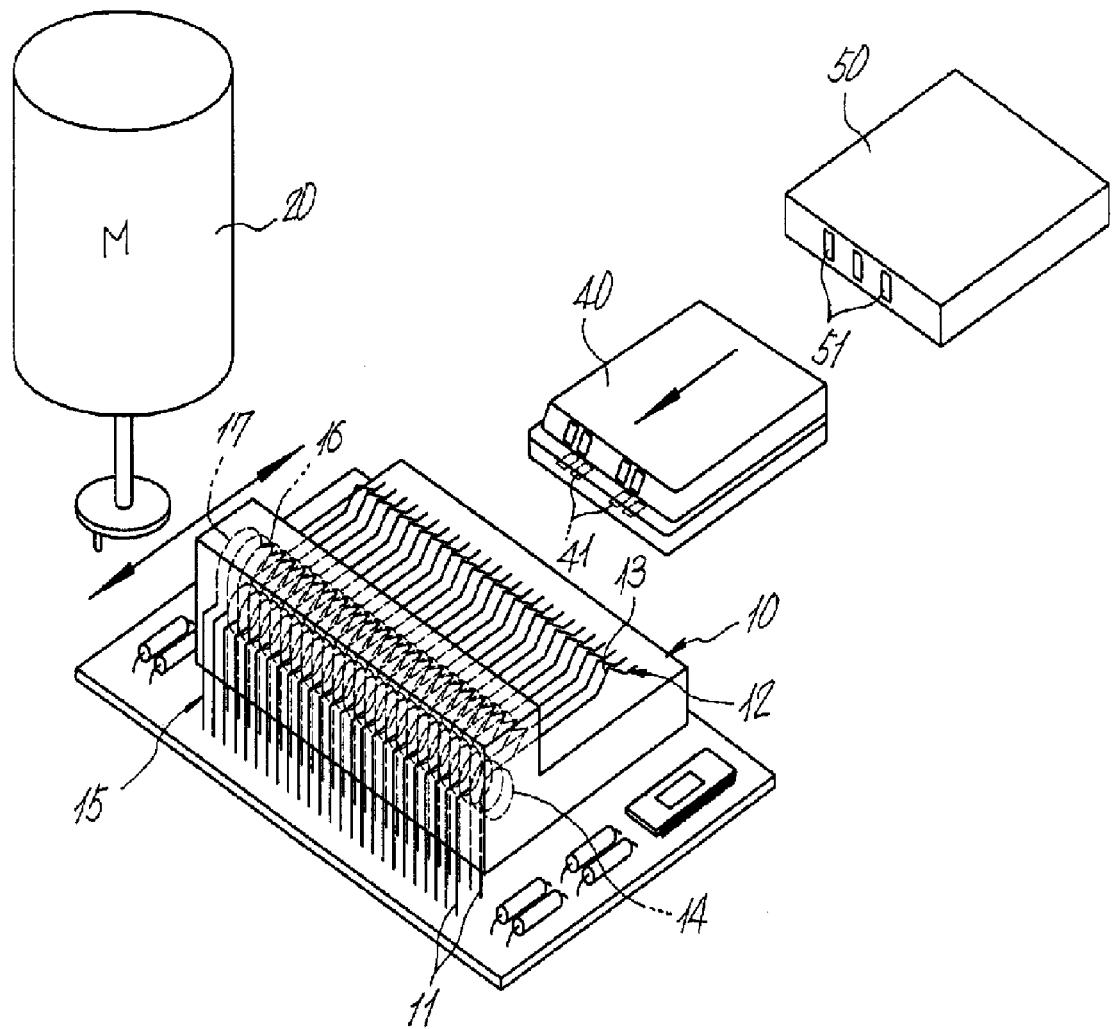

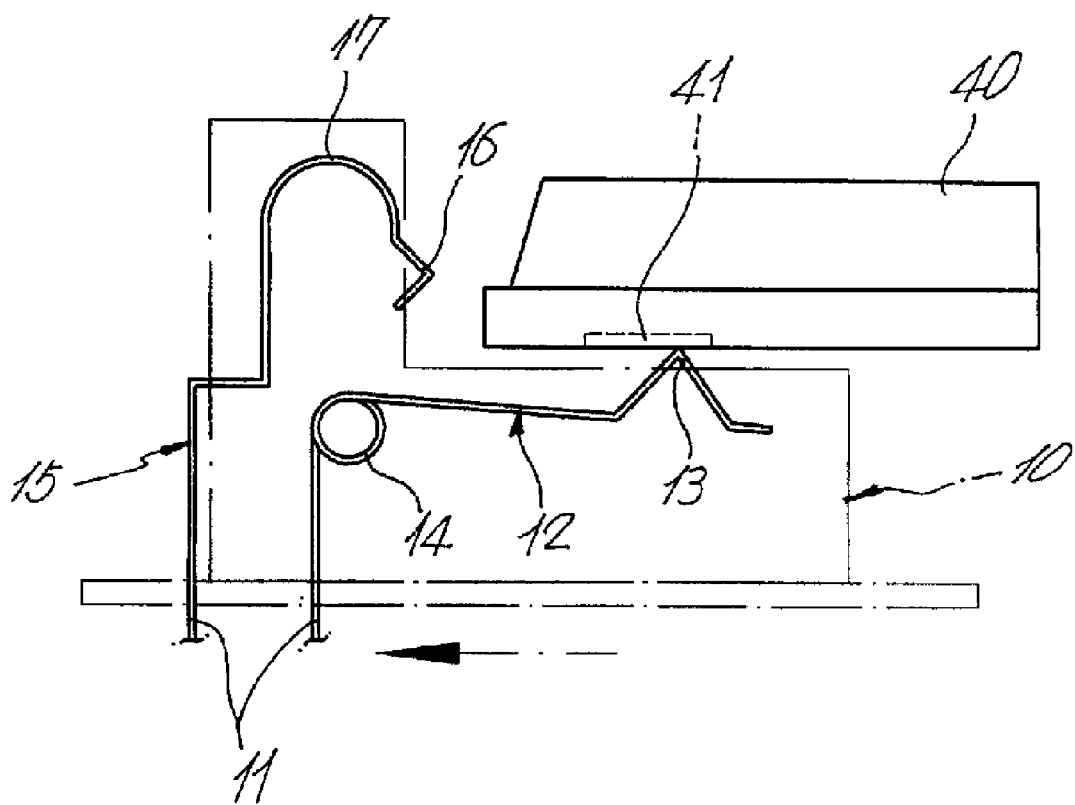
[Fig. 2]

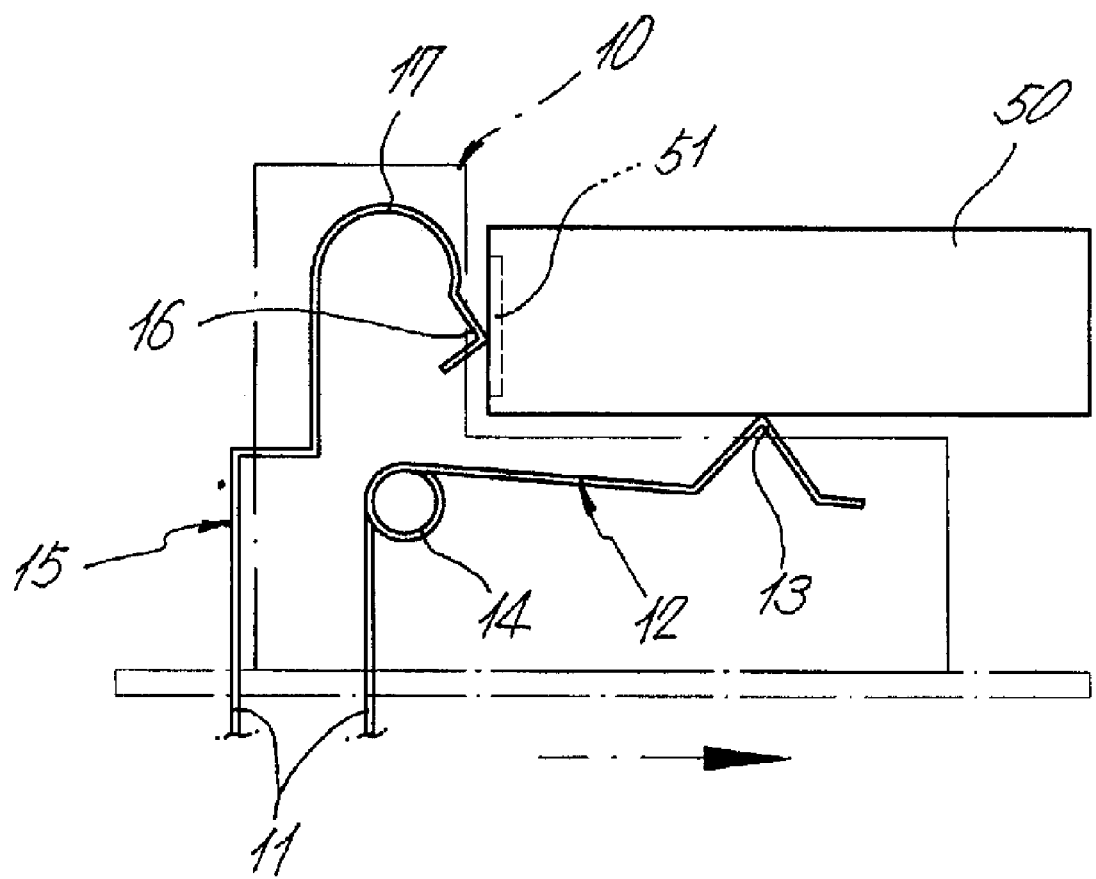
[Fig. 3]

[Fig. 4]
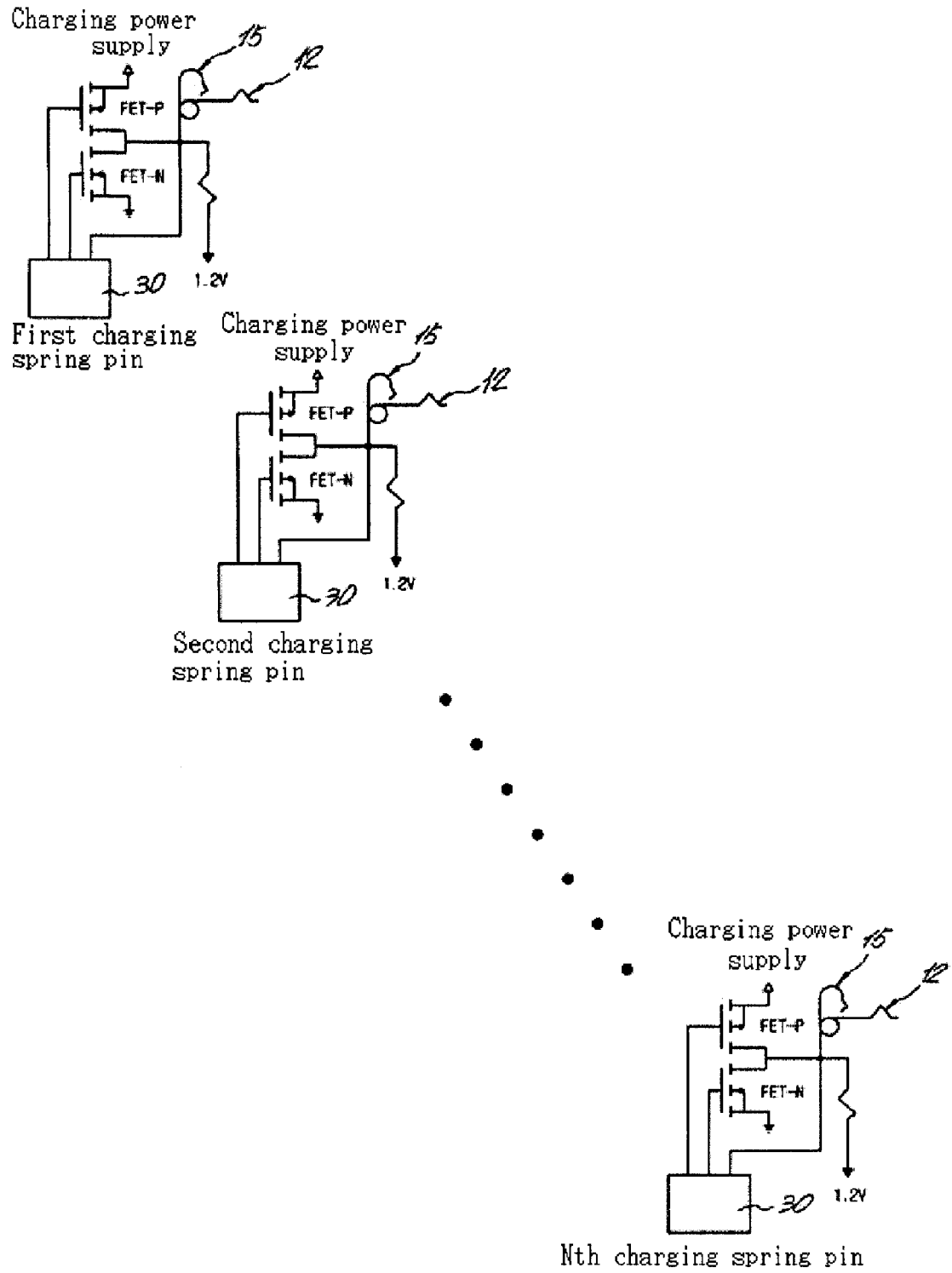

BATTERY CHARGER FOR PORTABLE EQUIPMENT

TECHNICAL FIELD

The present invention relates to a battery charger for multiple portable equipment, and more particularly, to a battery charger for multiple portable equipment that provides an easy charging of a discharged battery of a portable equipment regardless of a difference between sizes, polarities and positions of terminals of batteries of different portable equipments including mobile phones.

BACKGROUND ART

Portable equipments such as a mobile phone, a digital camera, a DMP, a PMP, MP3P and PDA are sold and used in a market. Demands for the portable equipments by the public are drastically increasing. Since the portable equipments require different types of batteries according to models and manufactures thereof, a universal charger for charging batteries of the mobile phones regardless of types thereof has been introduced.

However, the universal charger for the mobile phones is large in size and a user should personally adjust charging pins so that the charging pins contacts a charging terminal of the battery. Therefore, the charger is inconvenient and a service provider is sometimes required to provide a charging service.

Moreover, while a universal charger for charging a battery by inserting a connector of the charger into a pin connector of the mobile phone is available, the entire mobile phone rather than the battery itself is required for charging, resulting in a loss, a failure or a damage of the mobile phone. The universal charger also has a very slow charging speed and cannot be used for the battery of various mobile equipments having different types of pin connectors.

DISCLOSURE OF INVENTION

Technical Problem

Therefore, a battery charger for multiple portable equipment that provides an easy charging of a discharged battery of a portable equipment regardless of a difference between sizes, polarities and positions of terminals of batteries of different portable equipments including mobile phones is required.

Technical Solution

In order to achieve the object of the present invention, there is provided a battery charger for charging multiple types of portable equipments, the charger comprising:

a charging pin housing including a plurality of charging spring pins having a pre-determined distance therebetween;

a moving motor for detecting an insertion of a battery and sliding the charging pin housing inward and outward; and a charge controller for suspending an operation of the moving motor when a contact of a charging terminal of the inserted battery to two or more charging spring pins of the plurality of the charging spring pins are detected during the sliding of the charging pin housing, and for quick-charging the battery through the two or more charging spring pins connected to a charging circuit.

The plurality of the charging spring pins of the charging pin housing are arranged in a manner that fifteen to twenty five charging spring pins having the predetermined distance ranging from 1 to 2 mm are disposed, and wherein each of the plurality of the charging spring pins comprises: an inner surface charging spring pin for charging the battery by contacting an inner charging terminal of the inserted battery, the inner surface charging spring pin having a horizontal contact projection projecting upward from an inside of the charging pin housing at an end portion thereof; and a plurality of bottom surface charging spring pins for charging the battery by contacting a bottom surface charging terminal of the inserted battery, each of the plurality of bottom surface charging spring pins having a vertical contact projection projecting forward from the inside of the charging pin housing at the end portion thereof.

The inner surface charging spring pin extends from a lower portion of the charging pin housing to form a circular tension portion and is vertically bent forward to form a horizontal plane, the horizontal contact projection projecting upward along a slanting surface being formed at the end portion of thereof, and wherein each of the plurality of the bottom surface charging spring pins extends from the lower portion of the charging pin housing to form a semi-circular tension portion, the vertical contact projection projecting forward along a slanting surface at the end portion of thereof.

The charging circuit forms an electrically closed loop with the battery when two or more charging spring pins are in contact with an anode and a cathode of the battery, recognizes which of the plurality of the charging spring pins are connected to the anode and the cathode of the battery by reading out a voltage of around 3.6V from the charging spring pin connected to the anode, a voltage of 0V from the charging spring pin connected to the cathode, and a voltage of around 1.2V from the charging spring pin not connected so as to turn on a P channel FET connected to the charging spring pin connected to the anode and turn on a N channel FET connected to the charging spring pin connected to the cathode to, and completely charging the battery by flowing a current through the P channel FET, the anode of the battery, the cathode of the battery, the N channel FET, and a ground.

ADVANTAGEOUS EFFECTS

In accordance with the present invention, a discharged battery of a portable equipment may be charged easily regardless of a difference between sizes, polarities and positions of terminals of the battery of different portable equipments including mobile phones.

In addition, the number of the charging spring pins of the charging pin housing may be freely increased, and a distance between the charging spring pins may be adjusted according to the battery of portable equipment so that the charger may provide an easy charging as well as may adapt to different types of batteries, thereby improving an applicability of the mobile equipments in a mobile era.

Moreover, the charger may be installed in public places such as a terminal, a subway, a bank window, a tour and leisure facility, a caf and a VIP room of a hotel for he or she who use the mobile equipment for a long time so as to eliminate an inconvenience caused by a discharge of the battery in a short time.

BRIEF DESCRIPTION OF THE DRAWINGS

FIG. 1 is a diagram illustrating an overall concept of a charger in accordance with the present invention.

FIG. 2 is a diagram illustrating a vertical contact projection of a bottom surface charging spring pin contacting a charging terminal disposed at an inner surface of a battery in accordance with the present invention.

FIG. 3 is a diagram illustrating a horizontal contact projection of an inner surface charging spring pin contacting a charging terminal disposed at a inner surface of a battery in accordance with the present invention.

FIG. 4 is a diagram illustrating a connection relationship between a charging spring pin, a P channel FET and a N channel FET in accordance with the present invention.

DESCRIPTION OF REFERENCE NUMERALS

10: charging pin housing 11: charging spring pin
12: inner surface charging spring pin
13: horizontal contact projection
14: circular tension portion
15: bottom surface charging spring pin
16: vertical contact projection
17: semi-circular tension portion
20: moving motor
30: charge controller
40, 50: battery
41, 51: charging terminal

MODE FOR THE INVENTION

A preferred embodiment in accordance with the present invention will now be described in detail with reference to the accompanied drawings.

FIG. 1 is a diagram illustrating an overall concept of a charger in accordance with the present invention, FIG. 2 is a diagram illustrating a vertical contact projection of a bottom surface charging spring pin contacting a charging terminal disposed at a bottom surface of a battery in accordance with the present invention, FIG. 3 is a diagram illustrating a horizontal contact projection of an inner surface charging spring pin contacting a charging terminal disposed at a bottom surface of a battery in accordance with the present invention, and FIG. 4 is a diagram illustrating a connection relationship between a charging spring pin, a P channel FET and a N channel FET in accordance with the present invention.

A battery charger for charging multiple types of portable equipments comprises a charging pin housing 10 including a plurality of charging spring pins 11 having a pre-determined distance therebetween in horizontal and vertical directions, a moving motor 20 for sliding the charging pin housing 10 inward and then sliding the charging pin housing 10 outward, a charge controller 30 for quick charging batteries 40 and 50 when the plurality of the charging spring pins 11 of the charging pin housing 10 moved by the moving motor 20 are in contact with charging terminals 41 and 51 of the batteries 40 and 50.

Each of the plurality of the charging spring pins 11 of the charging pin housing 10 are arranged in a manner that fifteen to twenty five charging spring pins 11 are disposed to have a predetermined distance therebetween ranging from 1 to 2 mm. Each of the plurality of the charging spring pins 11 comprises an inner surface charging spring pin 12 for charging the battery 40 by contacting an inner charging terminal 41 of the inserted battery 40, wherein the inner surface charging spring pin 12 having a horizontal contact projection projecting upward from an inside of the charging pin housing 10 at an end portion thereof, and a plurality of bottom surface charging spring pins 15 for charging the battery 50 by contacting a bottom surface charging terminal 51 of the inserted battery 50, wherein each of the plurality of bottom surface charging spring pins 15 having a vertical contact projection projecting forward from the inside of the charging pin housing 10 at the end portion thereof.

The moving motor 20 detects an insertion of the batteries 40 and 50 and slides the charging pin housing 10 inward or outward. The charging pin housing 10 may be moved by a rotational force of the moving motor using a pinion (not shown) and a rack (not shown) disposed at a side portion of the charging pin housing 10, or is moved by fastening a first side of the charging pin housing 10 by a spring (not shown) and fixing a second side of the charging pin housing 10 to an axis of the motor via a string (not shown) and winding the string by the moving motor to move the charging pin housing 10 inward or outward.

The charge controller 30 suspends an operation of the moving motor 20 when a contact of the charging terminals 41 and 51 of the inserted batteries 40 and 50 with two or more charging spring pins 11 of the plurality of the charging spring pins 11 is detected during the sliding of the charging pin housing 10 to stop the sliding of the charging pin housing 10, and quick-charges the batteries 40 and 50 through the two or more charging spring pins 11 connected to a charging circuit. A currently charged and remaining amount of the batteries 40 and 50 and a time required for charging may be displayed through a display installed on a front panel of the charger.

On the other hand, the inserted batteries 40 and 50 instead of the charging pin housing 10 may be slided back and forth. In this case, the charging pin housing 10 maintains a fixed state, and the moving motor 20 slides the batteries 40 and 50 inward and outward. Various means may be used for moving the batteries 40 and 50. For instance, a rubber roller (not shown) may be installed at a position where the batteries 40 and 50 are inserted, and the rubber roller may be operated using the moving motor so as to slide the batteries 40 and 50 back and forth.

A method for using the battery charger for multiple portable equipments will now be described.

As shown in FIG. 1, when the discharged batteries 40 and 50 of portable equipments having the charging terminals 41 and 51 formed at an end portion of the inner surface or on a bottom surface thereof are inserted into the charger, a sensor (not shown) detects the insertion and transmits a signal to the charging controller 30. The charging controller 30 then rotates the moving motor 20 to slide the charging pin housing 10 inward along a sliding rail disposed at a bottom surface or at a side portion of the charging pin housing 10. The charging controller 30 slides the charging pin housing 10 outward to search for an anode and a cathode of the charging terminals 41 and 51 of the inserted batteries 40 and 50.

When a vertical contact projection 16 projecting forward with respect to a vertical plane of a plurality of bottom surface charging spring pins 15 of the charging spring pins 11 or a horizontal contact projection 13 projecting upward with respect to a horizontal plane of a plurality of inner surface charging spring pins 12 is in contact with the charging terminals 41 and 51 disposed at the end portion of the bottom surface or the inner surface of the batteries 40 and 50, the charging controller 30 detects the contact and initiates a quick-charging of the batteries 40 and 50.

The charging controller 30, as shown in FIG. 2, assumes that the charging terminal 41 of the battery 40 inserted in the charger is disposed at the end portion of the inner surface, and slowly slides the charging pin housing 10 that initially protrudes outward toward inside. When the horizontal contact projection 13 of the inner surface charging spring pin 12 projecting upward with respect to the horizontal plane of the charging pin housing 10 contacts the charging terminal 41 of the battery 40, the charging controller 30 is converted into a quick-charge state.

When the charging terminal 41 of the battery 40 is not recognized by the horizontal contact projection 13 of the inner surface charging spring pins 12 even if the charging pin housing 10 is positioned at an innermost region, the charging controller 30 assumes that the charging terminal 51 is disposed at the bottom surface of the battery 50, and slides the charging pin housing 10 outward by controlling the moving motor 20. When the vertical contact projection 16 of the bottom surface charging spring pins 15 projecting forward with respect to the vertical plane of the charging pin housing 10 contacts the charging terminal 51 of the battery 50, the charging pin housing 10 is suspended and the charging controller 30 is converted into a quick-charge state.

When the charging pin housing 10 slides inward and then slides outward to a outermost region and the charging terminals 41 and 51 of the batteries 40 and 50 are not in contact with the charging spring pins 11, the charging controller 30 determines that an inserted position of the batteries 40 and 50 is not correct, notifies a user through the display or a voice which requests a re-insertion of the battery, and resets itself to an initial state, and maintains a standby state wherein the quick-charging may be immediately initiated. The charging pin housing 10 may be initially positioned at the outermost position. It is natural that the batteries 40 and 50 inserted in the charger is fixed by a fixing device (not shown) such that the batteries 40 and 50 do not move in a horizontal direction and back and forth.

Since the charging spring pins 11 of the charging pin housing 10 should move smoothly when in contact with the charging terminals 41 and 51 of the batteries 40 and 50, a shape and a form of the charging spring pins 11 of the charging pin housing 10 are very important. Therefore, the inner surface charging spring pin 12 extends upward from a lower portion of the charging pin housing 10 and is vertically bent forward to form a horizontal plane, wherein a circular tension portion 14 is formed prior to the vertical bent portion and the horizontal contact projection 13 projecting upward along a slanting surface is formed at the end portion of thereof, and the bottom surface charging spring pins 15 extends from the lower portion of the charging pin housing 10 is vertically bent forward to form the horizontal plane and is vertically bent again upward, wherein a semi-circular tension portion 17 is formed and the vertical contact projection 16 projecting forward along a slanting surface is formed at the end portion of thereof.

It is natural that the inner surface charging spring pins 12 and the bottom surface charging spring pins 15 have an elasticity sufficient for a contact with the charging terminals 41 and 51 of the batteries 40 and 50 in a protruding state in a forward or an upward direction and for a smooth restoration when the charging terminals 41 and 51 are removed. The charging spring pins 11 should last a very harsh environment when actually used, thereby requiring a sufficient durability. Therefore, the shape and the material thereof are very important. First to Nth charging spring pins 11 may be used wherein the number of the charging spring pins 11 is determined by a distance between the charging spring pins 11 in parallel and a total width thereof determined by which batteries 40 an 50 are covered. When the distance ranges from 1 to 2 mm and the number of the charging spring pins 11 ranges from 15 to 25, virtually all types of the batteries 40 and 50 of the portable equipments may be charged.

More specifically, when the batteries 40 and 50 are inserted in the charger and the charge controller 30 is in a state of searching for the charging terminals 41 and 51 of the batteries 40 and 50 by sliding the charging pin housing 10 using the moving motor 20, voltages of the entire charging spring pins 11 are read out to be around 1.2V. While the voltages are bias voltages ranging from 0 to 2.5V, around 1.2V is most preferable (the charge controller 30 uses a microcomputer and an analog-to-digital converter to read out the voltages).

In this state, when two or more charging spring pins 11 are in contact with an anode and a cathode simultaneously, the batteries 40 and 50 form an electrically closed loop with a charging circuit of the charge controller 30. Since a voltage of the charging spring pins 11 connected to the anode is typically around 3.6V, which may vary according to a state of the batteries 40 and 50, a voltage of the charging spring pins 11 connected to the cathode is 0V, and a voltage of the charging spring pins 11 not connected is around 1.2V, the charge controller 30 recognizes which pin of the charging spring pins 11 is connected to the anode and the cathode of the charging terminals 41 and 51 of the batteries 40 and 50 and suspends the moving motor 20.

The charging circuit of the charge controller 30 turns on a P channel FET (Field Effect Transistor) connected to the charging spring pins 11 that is connected to the anode, and turns on a N channel FET connected to the charging spring pins 11 that connected to the cathode so that a current from a charging power supply to flow through the P channel FET, the anode of the batteries 40 and 50, the cathode of the batteries 40 and 50 and the N channel FET to a ground, thereby completely charging the inserted batteries 40 and 50. Since the charge controller 30 may read out 2.5V from a lithium-ion battery, around 1.2V which is an average of 0V and 2.5V is a most preferable bias voltage.

On the other hand, the charging process of the battery may be carried out by sliding the batteries 40 and 50 using the moving motor 20. In this case, the charging process of the battery is identical to the above-described charging process of the battery except that the batteries 40 and 50 are slided by the moving motor 20.

INDUSTRIAL APPLICABILITY

In accordance with the battery charger of the present invention, a discharged battery of a portable equipment may easily charged regardless of a difference between sizes, polarities and positions of terminals of batteries of different portable equipments including mobile phones. Therefore, the present invention has industrial applicability.

The invention claimed is:

1. A battery charger which charges different types of portable equipment, the charger comprising:
    a charging pin housing including a plurality of charging spring pins having a predetermined distance therebetween;
    a moving motor which is configured to detect insertion of a battery and configured to slide the charging pin housing inward and outward; and
    a charge controller configured to suspend operation of the moving motor when contact is detected between a charging terminal of the inserted battery and two or more charging spring pins of the plurality of the charging spring pins during sliding of the charging pin housing, and the charge controller is configured to quick-charge the battery through the two or more charging spring pins connected to a charging circuit.

2. The charger in accordance with claim 1, wherein the plurality of the charging spring pins comprises between 15 to 25 charging spring pins having the predetermined separation distance between approximately 1 mm to approximately 2 mm, and wherein each of the plurality of the charging spring pins comprises:

an inner surface charging spring pin configured to charge the battery through contact of an inner charging terminal of the inserted battery and the inner surface charging spring pin, wherein the inner surface charging spring pin has a horizontal contact projection projecting upward from an inside of the charging pin housing at an end portion thereof; and a plurality of bottom surface charging spring pins configured to charge the battery through contact of a bottom surface charging terminal of the inserted battery, wherein each of the plurality of bottom surface charging spring pins has a vertical contact projection projecting forward from the inside of the charging pin housing at the end portion thereof.

3. The charger in accordance with claim 2, wherein the inner surface charging spring pin extends from a lower portion of the charging pin housing to form a circular tension portion and is vertically bent forward to form a horizontal plane, wherein the horizontal contact projection projects upward along a slanting surface formed at the end portion of thereof, and wherein each of the plurality of the bottom surface charging spring pins extends from the lower portion of the charging pin housing to form a semi-circular tension portion, wherein the vertical contact projection projects forward along a slanting surface at the end portion of thereof.

4. The charger in accordance with claim 1, wherein the charging circuit forms an electrically closed loop with the battery when two or more charging spring pins are in contact with an anode and a cathode of the battery, wherein the charging circuit recognizes which of the plurality of the charging spring pins are connected to the anode and the cathode of the battery by reading out a voltage of around 3.6V from the charging spring pin connected to the anode, a voltage of 0V from the charging spring pin connected to the cathode, and a voltage of around 1.2V from the charging spring pin not connected, wherein the charging circuit is configured to turn on a P channel FET connected to the charging spring pin connected to the anode and turn on a N channel FET connected to the charging spring pin connected to the cathode, and wherein the charging circuit is configured to substantially completely charge the battery by flowing current through the P channel FET, the anode of the battery, the cathode of the battery, the N channel FET, and ground.

5. A battery charger which charges different types of portable equipment, the charger comprising:

a charging pin housing including a plurality of charging spring pins having a predetermined distance therebetween;

a moving motor configured to detect insertion of a battery and configured to slide the battery inward and outward; and a charge controller configured to suspend operation of the moving motor when contact is detected between a charging terminal of the inserted battery and two or more charging spring pins of the plurality of the charging spring pins during sliding of the battery, and the charge controller is configured to quick-charge the battery through the two or more charging spring pins connected to a charging circuit.

* * * * *